(12) United States Patent
Gabbur et al.

(10) Patent No.: US 12,580,865 B2
(45) Date of Patent: Mar. 17, 2026

(54) DETECTING IMBALANCES IN DATA TRAFFIC FOR DISTRIBUTED DATA CENTERS

(71) Applicant: eBay Inc., San Jose, CA (US)

(72) Inventors: Venkatesh Gabbur, Fremont, CA (US); Vivek Siva Kaushik, Pleasanton, CA (US); Jun Zhang, San Jose, CA (US)

(73) Assignee: eBay Inc., San Jose, CA (US)

( * ) Notice: Subject to any disclaimer, the term of this patent is extended or adjusted under 35 U.S.C. 154(b) by 44 days.

(21) Appl. No.: 18/795,023

(22) Filed: Aug. 5, 2024

(65) Prior Publication Data

US 2026/0039596 A1 Feb. 5, 2026

(51) Int. Cl.
*H04L 43/062* (2022.01)
*H04L 47/125* (2022.01)
*H04L 47/22* (2022.01)

(52) U.S. Cl.
CPC .......... *H04L 47/125* (2013.01); *H04L 43/062* (2013.01); *H04L 47/22* (2013.01)

(58) Field of Classification Search
CPC ...... H04L 47/125; H04L 47/22; H04L 43/062
See application file for complete search history.

(56) References Cited

U.S. PATENT DOCUMENTS 7,460,487 B2 12/2008 Hao et al.
8,948,036 B2 2/2015 Morrill et al.

9,515,910 B2 12/2016 Siegel et al.
10,542,024 B2 1/2020 Balabine et al.
11,171,846 B1 * 11/2021 Yalagandula ........... H04L 43/04
2017/0317932 A1 * 11/2017 Paramasivam ....... G06F 9/5083

FOREIGN PATENT DOCUMENTS

CN 100463418 A 2/2009
CN 10823975 A 11/2018

OTHER PUBLICATIONS

G. Aceto, A. Botta, A. Pescape and C. Westphal, "Efficient Storage and Processing of High-vol. Network Monitoring Data," in IEEE Transactions on Network and Service Management, vol. 10, No. 2, pp. 162-175, Jun. 2013, doi: 10.1109/TNSM.2013.011713.110215 (Year: 2013).*

(Continued)

*Primary Examiner* — Jason D Recek
(74) *Attorney, Agent, or Firm* — FIG.1 Patents

(57) ABSTRACT

Detecting imbalances in data traffic for distributed data centers is described. A distributed data center system can obtain a set of data samples corresponding to respective data traffic at data centers, the respective data traffic based on data associated with an application. The distributed data center system can generate subsets of weight-transformed data samples associated with respective intervals of time. The distributed data center system can generate respective indices associated with the subsets of weight-transformed data samples. The indices can be representative of a data traffic balance at the data centers. The distributed data center system can transmit a message indicating an index failing to satisfy a threshold value, the index being associated with at least one subset of weight-transformed data samples.

20 Claims, 9 Drawing Sheets

(56) References Cited

OTHER PUBLICATIONS

Bing Bai , "Monitoring and Identification of Abnormal Network Traffic by Different Mathematical Models", Retrieved from: Journal of Cyber Security and Mobility, vol. 11 5, 695-712. doi: 10.13052/jcsm2245-1439.1153, Dec. 3, 2022, 18 pages.

Chandola, Varun , "Anomaly Detection for Symbolic Sequences and Time Series Data", Thesis submitted to Graduate School of the University of Minnesota (1 of 5), Sep. 2009, 172 pages.

Chandola, Varun , "Anomaly Detection for Symbolic Sequences and Time Series Data", Thesis submitted to Graduate School of the University of Minnesota (2 of 5), Sep. 2009, 172 pages.

Chandola, Varun , "Anomaly Detection for Symbolic Sequences and Time Series Data", Thesis submitted to Graduate School of the University of Minnesota (3 of 5), Sep. 2009, 172 pages.

Chandola, Varun , "Anomaly Detection for Symbolic Sequences and Time Series Data", Thesis submitted to Graduate School of the University of Minnesota (4 of 5), Sep. 2009, 172 pages.

Chandola, Varun , "Anomaly Detection for Symbolic Sequences and Time Series Data", Thesis submitted to Graduate School of the University of Minnesota (5 of 5), Sep. 2009, 172 pages.

Jiang, Weiwei , et al., "Internet Traffic Prediction with Distributed Multi-Agent Learning", Retrieved from: Appl. Syst. Innov. 2022, 5, 121. https://doi.org/10.3390/asi5060121, May 2022, 12 pages.

Kasatkina, E V, et al., "Mathematical modeling and optimization of traffic flows", Journal of Physics: Conference Series, Retrieved from: doi: 10.1088/1742-6596/2134/1/012002, Dec. 2021, 9 pages.

Sheng, Shaojun , et al., "Network traffic anomaly detection method based on chaotic neural network", Retrieved from https://doi.org/10.1016/j.aej.2023.07.019, Aug. 15, 2023, 13 pages.

* cited by examiner

200 —→

Data traffic

=

+

Real data traffic 202

Time-wise pattern 204

Random pattern 206

Time

300 —→

Data traffic

Time

········    Data center 302-a          ———————    Data center 302-c

——×——    Data center 302-b

400 ⟍

500 ⟍

⋯⋯⋯⋯  Data center 302-a        ——————  Data center 302-c

—— ——  Data center 302-b

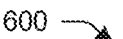
600
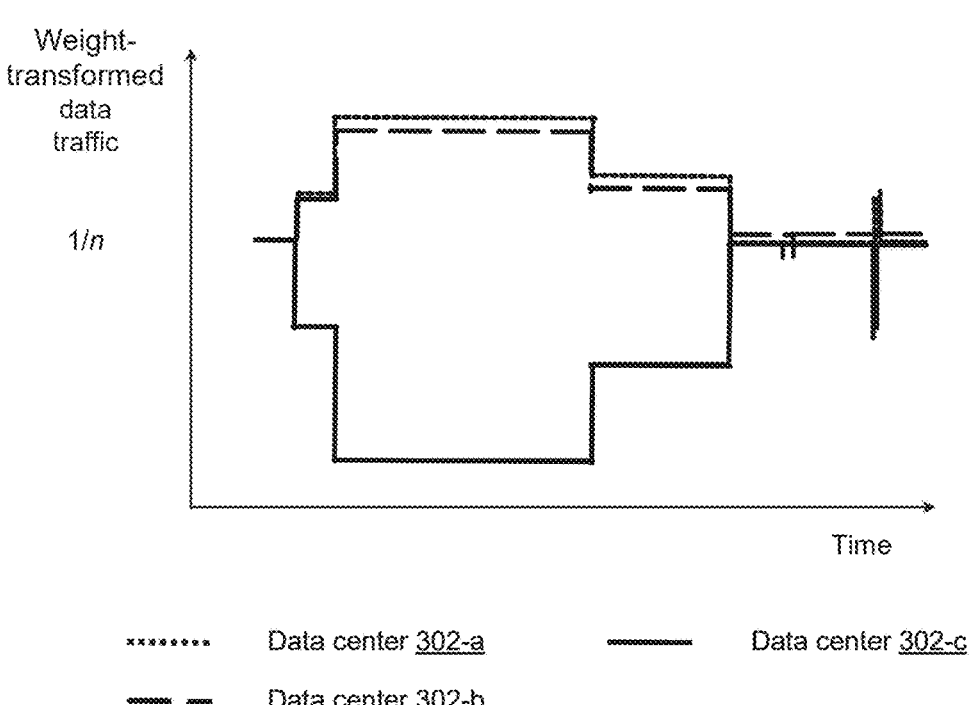
Weight-transformed data traffic
1/n
Time
········  Data center 302-a          ————  Data center 302-c
—··—··—  Data center 302-b
FIG. 6
700
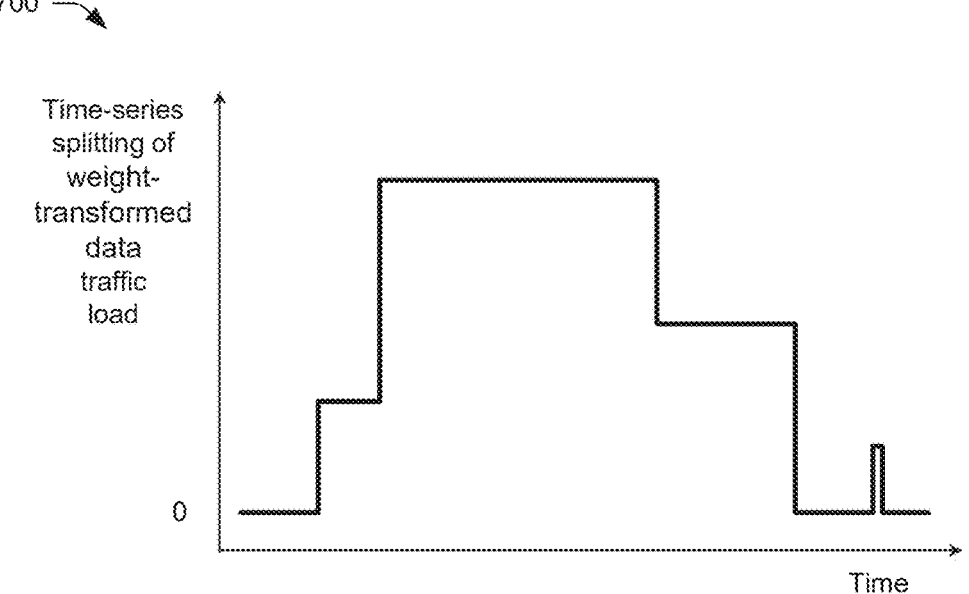
Time-series splitting of weight-transformed data traffic load
0
Time
FIG. 7

800

900

1000 —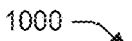

1002
Obtain a set of data samples corresponding to respective data traffic at data centers, the respective data traffic based on data associated with an application

1004
Generate, based on a set of weight-transformed data samples corresponding to the set of data samples, subsets of weight-transformed data samples associated with respective intervals of time, a subset of weight-transformed data samples of the subsets of weight-transformed data samples corresponding to a balanced state associated with the respective data traffic at the data centers

1006
Generate respective indices associated with the subsets of weight-transformed data samples, the respective indices indicating at least one of the balanced state associated with the respective data traffic at the data centers or an imbalanced state associated with the respective data traffic at the data centers

1008
Transmit a message indicating at least one index of the respective indices failing to satisfy at least one threshold value, the at least one index being associated with at least one subset of weight-transformed data samples of the subsets of weight-transformed data samples

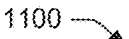

---

1102
Obtain a set of data samples corresponding to respective data traffic at data centers

↓

1104
Generate, based on a set of weight-transformed data samples corresponding to the set of data samples, subsets of weight-transformed data samples associated with respective intervals of time, where a subset of weight-transformed data samples of the subsets of weight-transformed data samples corresponding to a balanced state associated with the respective data traffic at the data centers

↓

1106
Generate respective indices associated with the subsets of weight-transformed data samples, the respective indices indicating at least one of the balanced state associated with the respective data traffic at the data centers or an imbalanced state associated with the respective data traffic at the data centers

↓

1108
Transmit instructions to cause display of a user interface that indicates at least one index of the respective indices, the at least one index associated with at least one subset of weight-transformed data samples of the subsets of weight-transformed data samples, and the at least one index failing to satisfy at least one threshold value

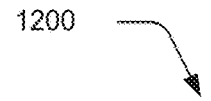
1200
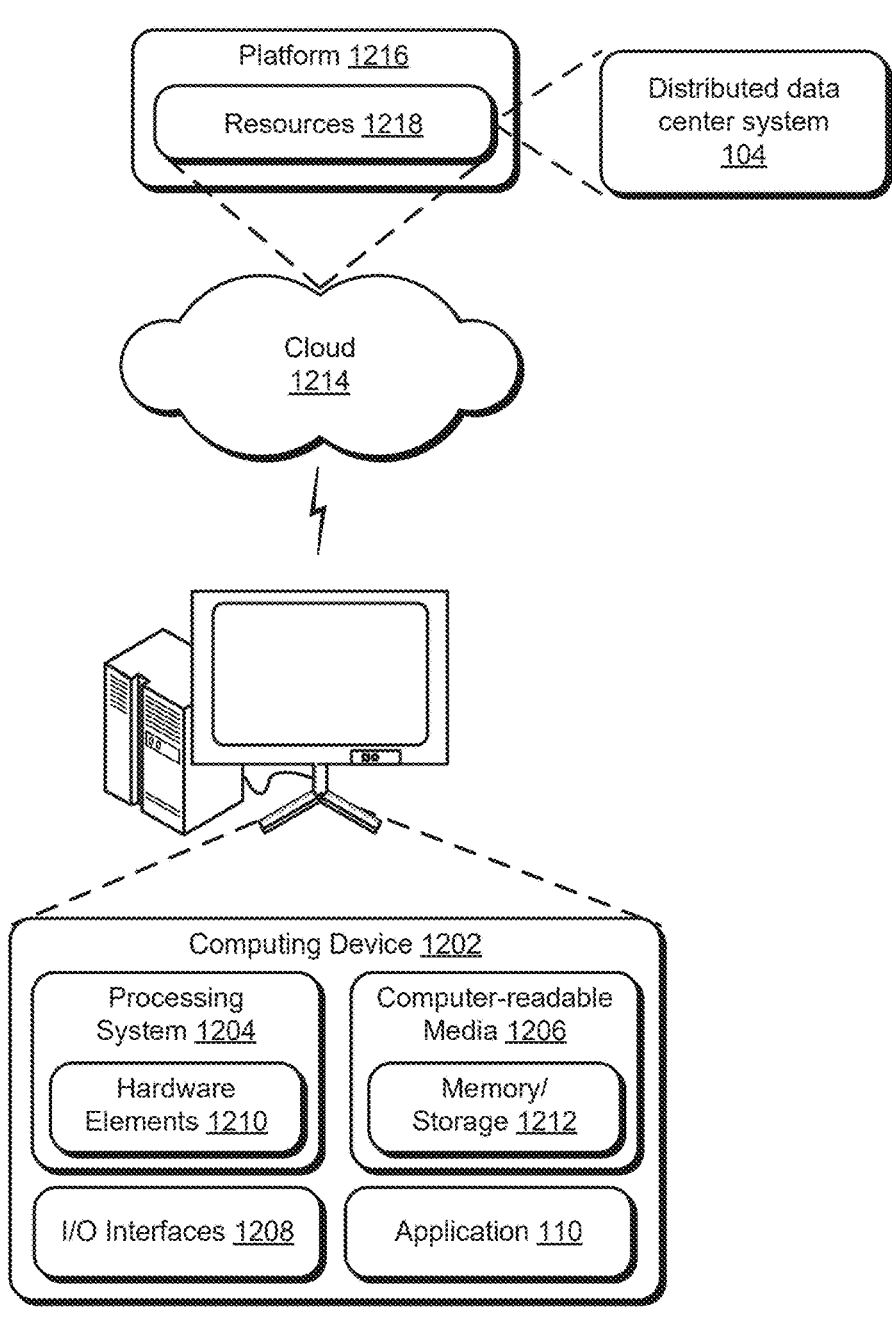
FIG. 12

DETECTING IMBALANCES IN DATA TRAFFIC FOR DISTRIBUTED DATA CENTERS

BACKGROUND

A computing device can implement one or more applications that provide functionality to a user of the computing device. For example, the applications can include, but are not limited to, an online marketplace application that provides for sale and purchase of items, a cloud computing application that provides data storage as well as other services to a user, a social media application that provides for sharing of content, or a streaming application for interacting with media content, among other examples. The application can use one or more data centers to store, process, and distribute data related to the applications. A data center is a centralized facility used to house and manage computer systems, servers, networking equipment, storage systems, and other hardware infrastructure for the data.

SUMMARY

Data for an application can be stored, processed, and/or distributed across multiple geographically dispersed data centers in a distributed data center system. The distributed data center system can receive data related to an application from a computing device. The distributed data center system can allocate the data to the data centers for processing, storage, and/or distribution, such that the data centers can have respective data traffic (e.g., a data traffic load). The distributed data center system can obtain a set of data samples that indicates the respective data traffic at the data centers. The distributed data center system can generate subsets of weight-transformed data samples for different intervals of time, where at least one of the subsets of weight-transformed data samples indicates that the data traffic is balanced across the data centers (e.g., a balanced state). The distributed data center system can generate indices (e.g., assign levels) for the subsets of weight-transformed data samples that indicate whether the data traffic is balanced across the data centers or imbalanced across the data centers during the intervals of time. If an index or level for a time period satisfies (e.g., exceeds, is greater than) a threshold value, then the distributed data center system can notify a computing device that the data traffic is imbalanced. The notification can include a message that indicates the imbalance and/or instructions to cause the computing device to display the index.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIGS. 5 and 6 depict example diagrams of weight-transformed data traffic for multiple data centers in a distributed data center system.

FIG. 7 depicts an example diagram of a time-series splitting of weight-transformed data traffic for multiple data centers in a distributed data center system.

FIGS. 10 and 11 depict procedures in example implementations of detecting imbalances in data traffic for distributed data centers.

FIG. 12 illustrates an example of a system that includes an example computing device that is representative of one or more computing systems and/or devices that may implement the various techniques described herein.

DETAILED DESCRIPTION

Overview

Figure 1:
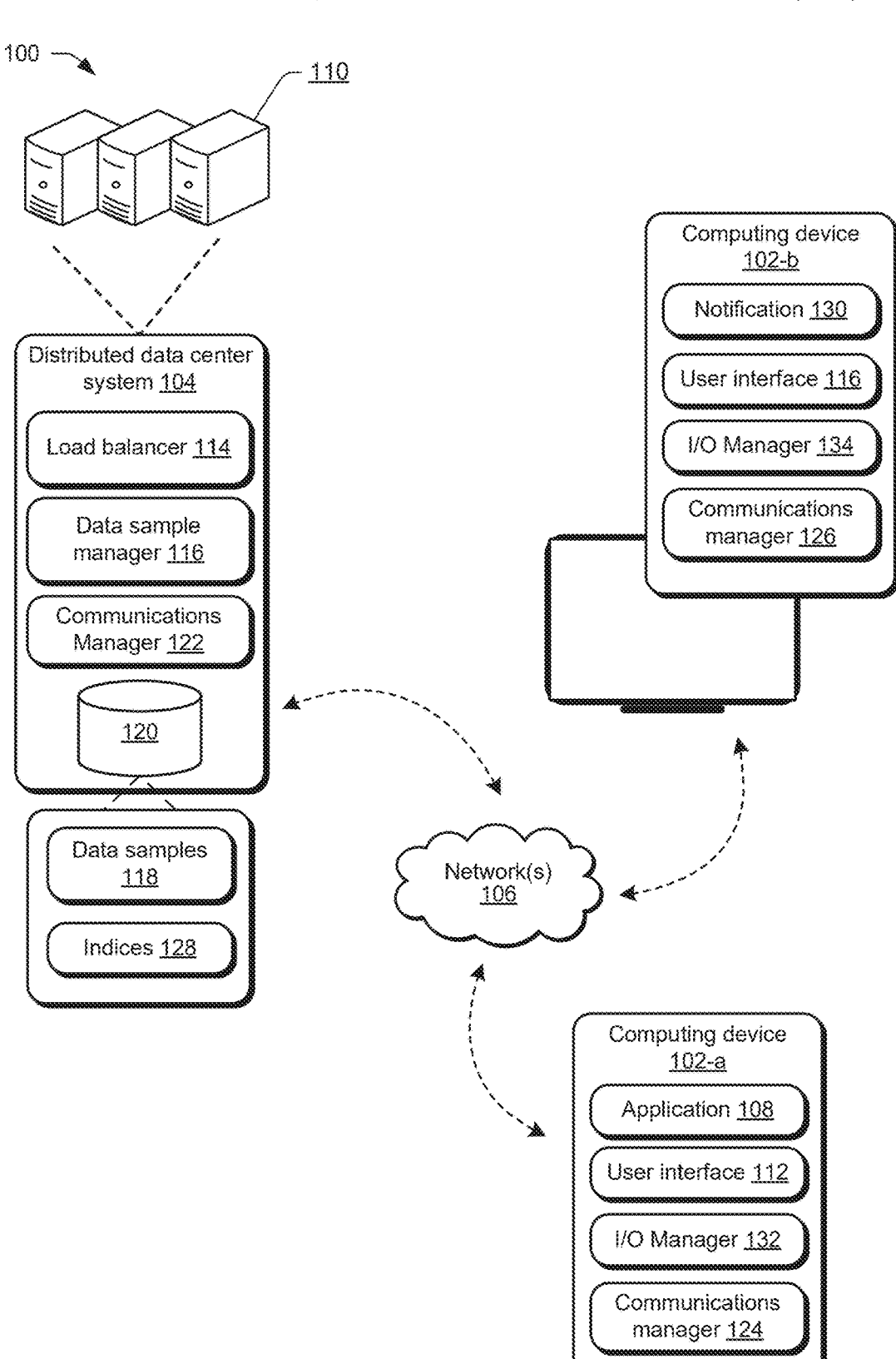
FIG. 1 is an illustration of an environment in an example implementation that is operable to employ techniques described herein.

Detecting imbalances in data traffic for distributed data centers is described. In accordance with the described techniques, a distributed data center system obtains a set of data samples that indicates respective data traffic at multiple data centers in the distributed data center system. The data traffic describes a volume of data at the data centers and can include data related to an application. The distributed data center system can weight-transform the data samples and then can divide (e.g., split) the weight-transformed data samples into subsets using values of the weight-transformed data samples and intervals of time. The distributed data center system can generate indices for the subsets of weight-transformed data samples that indicate whether the data traffic at the data centers is balanced or imbalanced over the intervals of time. In some examples, the distributed data center system can transmit a message to a computing device that indicates at least one index fails to satisfy (e.g., exceeds, is greater than) a threshold value. Additionally, or alternatively, the distributed data center system can transmit instructions to cause the computing device to display an index that fails to satisfy the threshold value.

An application can be deployed via multiple data centers in a distributed data center system, in which computing resources, infrastructure, and services are distributed across multiple geographically dispersed locations or facilities. A computing device can obtain data related to a user interaction with one or more features of the application. For example, a computing device can receive user input that indicates a data transaction related to an item listing listed for sale via an online marketplace application. The computing device can transmit the data to the distributed data center system, and the distributed data center system can route the data to one or more of the data centers. The data centers can have finite computing resources to store, process, and distribute the data (memory resources, processing resources, power resources, etc.). Thus, the distributed data center system can distribute the data traffic evenly across the data centers and/or according to a computing resource availability of the data centers. However, the distributed data center system may experience unexpected changes to the distribution of data traffic due to changes being deployed to the application or another interrelated application and/or changes to the infrastructure of the distributed data center system, among other changes. The changes to the distribution of data traffic can lead to imbalances in data traffic distribution to the data centers, such that a data center can receive a greater amount of data traffic (e.g., greater than a threshold value) than another data center. The computing resources that the data center uses to store, process, and distribute the data traffic can exceed available computing resources for that data center, causing degraded performance of the application by increasing latency for storing, processing, and distributing the data traffic.

As described herein, to reduce or prevent degraded performance of an application related to an imbalanced distribution of data traffic distribution to multiple data centers, a distributed data center system can detect the imbalances in the data traffic and can notify a computing device of the imbalances. The distributed data center system can obtain (e.g., receive and/or store) a set of data samples that represents a data traffic distribution across the multiple data centers over time. The distributed data center system can weight-transform the data samples and can divide the weight-transformed data samples into subsets that span different time intervals by grouping the weight-transformed data samples in the time intervals according to a value of the weight-transformed data samples (e.g., a maximum error for the weight-transformed data samples). The distributed data center system computes indices for the subsets of weight-transformed data samples that represent a level of imbalance of data traffic distribution across the data centers for respective subsets. If the index and corresponding level of imbalance exceeds (e.g., fails to satisfy, is greater than) one or more thresholds, then the distributed data center system notifies a computing device of the imbalance. The computing device can send a corrective action to the distributed data center system that results in the correction of the imbalance and that includes a modification to the data traffic distribution to the multiple data centers.

Detecting data traffic imbalances and redistributing data traffic across data centers reduces delays to processing, storage, and distribution of data by ensuring the data traffic is evenly distributed (e.g., balanced) across the data centers in a distributed data center system. For example, even distribution of data traffic ensures that no single data center becomes overloaded, thereby reducing latency and improving response times for end users. Additionally, or alternatively, even distribution of data traffic provides for the data centers to more efficiently allocate (e.g., avoid or prevent over allocation or under allocation) of computational resources, including, but not limited to, processing, memory, and storage resources.

In some aspects, the techniques described herein relate to a computer-implemented method including obtaining a set of data samples corresponding to respective data traffic at a set of data centers, generating, based on a set of weight-transformed data samples corresponding to the set of data samples, a set of subsets of weight-transformed data samples associated with respective intervals of time, where a subset of weight-transformed data samples of the set of subsets of weight-transformed data samples corresponds to a balanced state associated with the respective data traffic at the set of data centers, generating respective indices associated with the set of subsets of weight-transformed data samples, the respective indices indicating at least one of the balanced state associated with the respective data traffic at the set of data centers or an imbalanced state associated with the respective data traffic at the set of data centers, and transmitting a message indicating at least one index of the respective indices failing to satisfy at least one threshold value, the at least one index being associated with at least one subset of weight-transformed data samples of the set of subsets of weight-transformed data samples.

In some aspects, the techniques described herein relate to a computer-implemented method, where obtaining the set of data samples includes receiving, from the set of data centers, respective reports including the set of data samples.

In some aspects, the techniques described herein relate to a computer-implemented method, further including receiving, from at least one computing device, data associated with an application, where the respective data traffic is based on the data, and routing the data associated with the application to the set of data centers, the set of data samples corresponding to an amount of the data associated with the application routed to respective data centers of the set of data centers.

In some aspects, the techniques described herein relate to a computer-implemented method, where obtaining the set of data samples includes storing the set of data samples based on the routing the data associated with the application to the set of data centers.

In some aspects, the techniques described herein relate to a computer-implemented method, further including determining the set of subsets of weight-transformed data samples based on comparing differences between weight-transformed data samples in the set of weight-transformed data samples to one or more threshold values, the respective intervals of time being associated with the differences between the weight-transformed data samples in the set of weight-transformed data samples satisfying the one or more threshold values.

In some aspects, the techniques described herein relate to a computer-implemented method, where the balanced state associated with the respective data traffic at the set of data centers is based on the respective data traffic at the set of data centers satisfying respective threshold values associated with computing resources available at the set of data centers.

In some aspects, the techniques described herein relate to a computer-implemented method, where the imbalanced state associated with the respective data traffic at the set of data centers is based on data traffic associated with at least one data center of the set of data centers failing to satisfy at least one respective threshold value associated with computing resources available for the at least one data center.

In some aspects, the techniques described herein relate to a computer-implemented method, further including receiving, responsive to the message, instructions corresponding to a modification to data traffic associated with at least one data center of the set of data centers, the modification to the data traffic associated with the at least one data center corresponding to at least one updated index associated with the at least one subset of weight-transformed data samples that satisfies the at least one threshold value.

In some aspects, the techniques described herein relate to a computer-implemented method, where generating the respective indices associated with the set of subsets of weight-transformed data samples includes determining a respective calibration value associated with the respective indices based on a respective frequency value and a respective scale value of the set of subsets of weight-transformed data samples and applying the respective calibration value to the respective indices.

In some aspects, the techniques described herein relate to a computer-implemented method, where transmitting the message includes determining a confidence score associated with the at least one index of the respective indices satisfies a threshold value, the confidence score being based on one or more statistical characteristics of the at least one subset of weight-transformed data samples.

In some aspects, the techniques described herein relate to a system including one or more processors, and a computer-readable storage medium storing instructions that are executable by the one or more processors to perform operations including obtaining a set of data samples corresponding to respective data traffic at a set of data centers, generating, based on a set of weight-transformed data samples corresponding to the set of data samples, a set of subsets of weight-transformed data samples associated with respective intervals of time, where a subset of weight-transformed data samples of the set of subsets of weight-transformed data samples corresponds to a balanced state associated with the respective data traffic at the set of data centers, generating respective indices associated with the set of subsets of weight-transformed data samples, the respective indices indicating at least one of the balanced state associated with the respective data traffic at the set of data centers or an imbalanced state associated with the respective data traffic at the set of data centers, and transmitting a message indicating at least one index of the respective indices failing to satisfy at least one threshold value, the at least one index being associated with at least one subset of weight-transformed data samples of the set of subsets of weight-transformed data samples.

In some aspects, the techniques described herein relate to a system, where to obtain the set of data samples, the operations further include receiving, from the set of data centers, respective reports including the set of data samples.

In some aspects, the techniques described herein relate to a system, where the operations further include receiving, from at least one computing device, data associated with an application, where the respective data traffic is based on the data, and routing the data associated with the application to the set of data centers, the set of data samples corresponding to an amount of the data associated with the application routed to respective data centers of the set of data centers.

In some aspects, the techniques described herein relate to a system, where the operations further include determining the set of subsets of weight-transformed data samples based on comparing differences between weight-transformed data samples in the set of weight-transformed data samples to one or more threshold values, the respective intervals of time being associated with the differences between the weight-transformed data samples in the set of weight-transformed data samples satisfying the one or more threshold values.

In some aspects, the techniques described herein relate to a computer-implemented method including obtaining a set of data samples corresponding to respective data traffic at a set of data centers, generating, based on a set of weight-transformed data samples corresponding to the set of data samples, a set of subsets of weight-transformed data samples associated with respective intervals of time, where a subset of weight-transformed data samples of the set of subsets of weight-transformed data samples corresponds to a balanced state associated with the respective data traffic at the set of data centers, generating respective indices associated with the set of subsets of weight-transformed data samples, the respective indices indicating at least one of the balanced state associated with the respective data traffic at the set of data centers or an imbalanced state associated with the respective data traffic at the set of data centers, and transmitting instructions to cause display of a user interface that indicates at least one index of the respective indices, the at least one index associated with at least one subset of weight-transformed data samples of the set of subsets of weight-transformed data samples, and the at least one index failing to satisfy at least one threshold value.

In some aspects, the techniques described herein relate to a computer-implemented method, further including receiving, from the computing device, a request for information corresponding to the respective data traffic at the set of data centers, and transmitting, responsive to the request, the information, the information including one or more of application data corresponding to an application associated with the respective data traffic, the set of data samples, a status associated with respective data centers of the set of data centers, or an indication of computational resource usage associated with the respective data centers.

In some aspects, the techniques described herein relate to a computer-implemented method, where the request is received based on user input at the user interface.

In some aspects, the techniques described herein relate to a computer-implemented method, further including receiving instructions corresponding to a modification to data traffic associated with at least one data center of the set of data centers, the modification to the data traffic associated with the at least one data center corresponding to at least one updated index associated with the at least one subset of weight-transformed data samples that satisfies the at least one threshold value.

In some aspects, the techniques described herein relate to a computer-implemented method, where obtaining the set of data samples includes receiving, from the set of data centers, respective reports including the set of data samples.

In some aspects, the techniques described herein relate to a computer-implemented method, where the at least one threshold value is based on an application associated with the respective data traffic.

Example of an Environment

FIG. 1 is an illustration of an environment 100 in an example implementation that is operable to employ techniques described herein. The environment 100 includes a computing device 102-a, a computing device 102-b, and a distributed data center system 104. In one or more implementations, the computing device 102-a, the computing device 102-b, and the distributed data center system 104 are communicatively coupled, one to another, via network(s) 106. One example of the network(s) 106 is the Internet, although the computing device 102-a, the computing device 102-b, and the distributed data center system 104 may be communicatively coupled using one or more different connections or different networks 106 (e.g., wireless networks) in various implementations.

Although the distributed data center system 104 is depicted in the environment 100 as being separate from the computing device 102-a and the computing device 102-b, in one or more implementations, an entirety, or various portions of the distributed data center system 104 are implemented at or by the computing device 102-a and/or the computing device 102-b. In at least one implementation, the distributed data center system 104 provides infrastructure and resources to support an application 108 of the computing device 102-a. The distributed data center system 104 can use various resources of the computing device 102-a, such as hardware resources, an operating system, firmware, and so forth to process, distribute, and/or store data related to the application 108. Alternatively, or additionally, the distributed data center system 104 is implemented by server-based storage resources, processing resources, and so on of devices other than the computing device 102-a and/or the computing device 102-b. For example, at least a portion of the distributed data center system 104 is implemented by hardware and software components that make up respective data centers 110 in the distributed data center system 104, including, but not limited to, servers, data storage systems, or networking equipment.

A data center 110 includes a combination of hardware and software components at a geographic location that provide the infrastructure to support and manage data and applications 108 that are running at one or more computing devices (e.g., the computing device 102-*a*). The hardware components can include, but are not limited to, servers, memory storage devices, memory storage systems, networking equipment to forward data packets between different devices via the networks 106, or other systems related to cooling and power supply. The software components can include, but are not limited to, an operating system, data management software, data storage software, networking software, security software, monitoring software tools, or management software tools, among other examples. The hardware and software components of a data center 110 process, store, and distribute data, such as data related to the application 108.

A computing device 102-*a* and a computing device 102-*b* are configurable in a variety of ways. A computing device, for instance, is configurable as a desktop computer, a laptop computer, a mobile device (e.g., assuming a handheld configuration such as a tablet or mobile phone), an IoT device, a wearable device (e.g., a smart watch, a ring, or smart glasses), an augmented reality and/or virtual reality device (e.g., the smart glasses), a server, and so forth. Thus, a computing device ranges from full resource devices with substantial memory and processor resources to low-resource devices with limited memory and/or processing resources. Although in instances in the following discussion reference is made to a computing device in the singular, a computing device may also be representative of multiple different devices, such as multiple servers of a server farm utilized to perform operations "over the cloud" as further described in relation to FIG. 12.

In at least one implementation, the application 108 supports communication of data across the network(s) 106 between the computing device 102-*a*, the computing device 102-*b*, and the distributed data center system 104. By supporting such data communication, the application 108 provides a respective user of the computing device 102-*a* (e.g., and users of other computing devices) access to different functionalities of the application 108. One example of the application 108 is a browser or other web application that facilitates user interaction with one or more features of the application 108. Another example of the application 108 is a web-based computer application that facilitates user interaction with one or more features of the application 108, such as a mobile application or a desktop application. The application 108 may be configured in different ways, which enable users to interact with the computing device 102-*a* and by extension perform actions to interact with the features of the application 108, without departing from the spirit or scope of the techniques described herein.

For example, the application 108 can be an example of an online marketplace application that provides for sale and purchase of items, a cloud computing application that provides data storage as well as other services to a user, a social media application that provides for sharing of content, or a streaming application for interacting with media content. The computing device 102-*a* can receive user input via a user interface 112 of the computing device 102-*a*. The user input can trigger an exchange of data between the computing device 102-*a* and one or more other devices over the networks 106. The data can include, but is not limited to, user data related to registering a user during account creation or access for the application 108, data that includes media content items (e.g., for streaming or otherwise consuming), data describing one or more items listed for sale, interaction data related to a user interacting with one or more features of the application 108, transaction data, communication data between different users of the application 108, security and authentication data, or any other data related to the application 108.

The computing device 102-*a* can display the user interface 112 via display devices or by making accessible voice-based user interfaces. Through interaction of a user with the computing device 102-*a*, the application 108 receives user input via the user interfaces 112. Examples of such input include, but are not limited to, receiving touch input in relation to portions of a displayed user interface, receiving one or more voice commands or other audio input, receiving typed input (e.g., via a physical or virtual ("soft") keyboard), receiving mouse or stylus input, and so forth.

In some examples, the distributed data center system 104 can include multiple data centers 110. Although the distributed data center system 104 is illustrated as including three data centers 110, the distributed data center system 104 can include any numerical quantity of data centers 110. The distributed data center system 104 can include a load balancer 114 to manager distribution of data across the data centers 110 in the distributed data center system 104. The load balancer 114 can be an example of software (e.g., logic) and/or hardware (e.g., processor and/or memory) that is configured to receive incoming data via the network 106 and direct the incoming data to the data centers 110. The load balancer 114 can analyze an amount of data, referred to as data traffic, and can ensure an even distribution of the data traffic to the data centers 110. For example, the load balancer 114 can implement various algorithms to determine how to distribute the data traffic, such as a round-robin algorithm, a least connections algorithm, or a least response time algorithm, among other examples.

In some examples, the load balancer 114 can detect a server failure and/or performance degradation of a server at a data center 110 and can redirect traffic to different data centers 110, which improves one or more performance metrics (latency, quality, etc.) of an application 108 by reducing or preventing delays and quality deterioration resulting from the server failure or performance degradation of the server. Additionally, or alternatively, the load balancer 114 can distribute the data traffic related to an application 108 to multiple different data centers 110 that are geographically dispersed, so as to introduce redundancy to the distributed data center system 104. Thus, if a data center 110 has a server failure, has a security failure, or any other type of failure, then the distributed data center system 104 can continue to support distribution, storage, and processing of data traffic for the application 108 by the load balancer 114 routing the data traffic to the other data centers 110 in the distributed data center system 104.

In some examples, the data traffic can be inconsistent due to changes at the application 108, changes to the load balancer 114, and/or changes to the data centers 110. For example, the application 108, an application that is interrelated to the application 108, the load balancer 114, and/or the data centers 110 can experience routine maintenance, can experience security attacks that cause a device to be disabled, and/or experience other types of failure. Thus, the load balancer 114 may be unable to distribute the data traffic evenly across the data centers 110 in the distributed data center system 104. If the data traffic is unevenly distributed to different data centers 110, such that one or more data centers 110 have a greater amount of data to process, distribute, and/or store than the other data centers 110, then the application 108 can experience latencies and other performance degradation. For example, a data center 110 may receive an amount of data that exceeds a numerical quantity of computational resources (e.g., processing and/or memory resource) available to the data center 110. Thus, the data center 110 may be unable to process, distribute, and/or store the data as the data is received, causing delays and/or reduced quality.

Conventional techniques for reducing or preventing uneven distribution of data traffic across multiple data centers 110 can include calculating an average value of data traffic over a time period to determine whether the data traffic exceeds or falls below a certain threshold relative to a moving average. However, calculating an average value of data traffic over a time period may not account for sudden changes or anomalies in the data traffic. Other conventional techniques include decomposing seasonal factors (hourly, daily, weekly, etc.) out of time-series data, which assumes that the data traffic follows a consistent seasonal pattern. However, the seasonal pattern may not be consistent, thus the process does not effectively capture irregular or non-seasonal fluctuations (e.g., caused by region exit and rebalance). Additionally, or alternatively, conventional techniques include performing anomaly detection using a machine learning model and/or time-series models, which can produce false positives and/or use a large amount of historical data.

In some examples, to detect uneven data traffic that can include sudden changes and inconsistent patterns without producing false positives or increasing computational complexity, a distributed data center system 104 can implement a data sample manager 116 to measure and analyze imbalances in a data traffic distribution to the data centers 110. The data sample manager 116 can collect one or more data samples 118 representative of an amount of data distributed to respective data centers 110 in the distributed data center system 104 over time. For example, the data sample manager 116 can receive reports from the data centers 110 that include the set of data samples 118. The data centers 110 can periodically transmit the reports and/or can transmit the reports when there is a change in the data traffic at the data center 110 (e.g., in real-time). Additionally, or alternatively, the data sample manager 116 can obtain the set of data samples 118 from the load balancer 114 as the load balancer 114 allocates the data for distribution to the data centers 110. For example, the load balancer 114 can store the set of data samples when routing the data related with the application to the data centers 110.

The data sample manager 116 can be an example of hardware and/or software configured to collect and manipulate the data samples 118. The data sample manager 116 can be implemented at a data center 110 and/or at a computing device 102-b, which may be an example of a computing device 102-b of a user responsible for monitoring and correcting data traffic imbalances at the data centers 110. In some examples, the data sample manager 116 can store the data samples 118 at a data storage 120. The data storage 120 can be an example of a database or other data storage system or device at a data center 110, at the computing device 102-b, and/or at another device. Examples of the data storage 120 include, but are not limited to, mass storage and virtual storage. In one or more implementations, for example, the data storage 120 may be virtualized across multiple data centers 110 and/or cloud-based storage devices. The distributed data center system 104 can access the data storage 120 to obtain the data samples 118. The distributed data center system 104 can analyze the data samples 118 to determine whether there is a data traffic imbalance at the data centers 110 and/or the distributed data center system 104 can transmit the data samples 118 to the computing device 102-b. The computing device 102-b can analyze the data samples 118 to determine whether there is a data traffic imbalance at the data centers 110.

In some examples, distributed data center system 104, the computing device 102-a, and the computing device 102-b implement a communications manager 122, a communications manager 124, and a communications manager 126, respectively, to support communication of data across the network(s) 106 between the computing device 102-a, the computing device 102-b, and the distributed data center system 104. By supporting such data communication, the communications manager 122 and the communications manager 124 provide for the computing device 102-a and the distributed data center system 104 to exchange data related to an application 108 for processing, storage, and/or distribution via the data centers 110. The communications manager 122 and the communications manager 126 provides for the computing device 102-b and the distributed data center system 104 to exchange data related to data traffic imbalances at the data centers 110. The data related to the data traffic imbalances can include, but is not limited to, the data samples, one or more indices 128 that indicate a level of imbalance at respective data centers 110, one or more corrective actions and/or one or more modifications to the data traffic at the data centers 110, among other data.

In some examples, the data samples 118 can include an amount of data traffic at respective data centers 110 over a period of time. In some cases, the data samples 118 can include data traffic at the data centers 110 in real-time, such that the period of time is continuous from a current time to a configured or defined historical time. The data samples 118 can include one or more patterns, including time-wise patterns and random fluctuation patterns. Time-wise patterns can include trends or patterns in the data samples 118 over different time periods (e.g., a day, a week, or irregular). The random fluctuation patterns can include variations in the data samples 118 (e.g., a frequency and/or an amplitude of the data samples 118). The patterns in the data samples 118 are described in further detail with respect to FIG. 2.

In some examples, such as if the data traffic is distributed evenly across three data centers 110, respective data centers 110 can receive a portion of the data traffic to process, store, and/or distribute. The portion of the data traffic can be a percentage of the total data traffic, such as 33% if there are three data centers, which is described in further detail with respect to FIG. 3. However, if there is an imbalance in the data traffic, one or more of the data centers 110 may receive a greater portion or a lower portion of the data traffic, which is described in further detail with respect to FIG. 4. The data samples 118 can also have a measure of irregularity that indicates a degree to which the data samples 118 fluctuate.

The distributed data center system 104 can quantify the different patterns in the data samples 118. For example, the distributed data center system 104 can transform or convert the data samples 118 that represents original time-series data into flat time-series data for respective data centers 110 using one or more weights (e.g., values, parameters, ground-truth weights) in a process referred to as weight-transformation. The distributed data center system 104 can obtain a proportion of data traffic distribution to respective data centers 110 using the weight-transformation (e.g., rather than an absolute value of the data traffic). The distributed data center system 104 can weight-transform the data samples 118 according to Equation 1:

$$\{v_i'(t)\}_{t\ge 0} = \left\{\frac{v_i(t)}{\sum_{j=1}^{n} v_j(t)}\right\}_{t\ge 0} \text{, for } 1 \le i \le n, \tag{1}$$

where $v_i(t)$ is a data sample 118 with an index, i, in a set of data samples 118. Weight-transforming the data samples 118 eliminates the time-wise patterns, which is described in further detail with respect to FIG. 5.

In some cases, the data traffic includes imbalances, such that the data traffic is not evenly distributed across the data centers 110 in the distributed data center system 104. Thus, the distributed data center system 104 can use a ground truth weight of data traffic for respective data centers 110 during weight-transformation, which is described in further detail with respect to FIG. 6. For example, the distributed data center system 104 can weight-transform the data samples 118 according to Equation 2:

$$\{WT_i(t)\}_{t\ge 0} = \left\{\frac{v_i(t)}{\left(\sum_{j=1}^{n} v_j(t)\right) * w_i} * \frac{1}{n}\right\}_{t\ge 0} \text{, for } 1 \le i \le n. \tag{2}$$

In some examples, without calibration, weight-transformed data traffic for an exited region may be zero, which the distributed data center system 104 may detect as an imbalance. An exited region refers to a point where data leaves one geographic region or data center 110 to enter another. Thus, the distributed data center system 104 can detect a period of time when a data center 110 has data samples 118 with values of zero for an amount of data traffic. The distributed data center system 104 can calibrate (e.g., via weight-transformation) the data traffic for exited data centers 110 as zero and can set the weight-transformed value to the inverse of the numerical quantity of data centers 110 (e.g., 1/n for n data centers). For example, the distributed data center system 104 can apply a calibration factor. The calibration factor can be the number of data centers 110 divided by a number of non-exited data centers 110 (e.g., 1.5 for three total data centers 110 and one exited data center 110). The distributed data center system 104 can apply the calibration factor to the non-exited data centers 110. The distributed data center system 104 can perform a training process to determine a period of time over which the data traffic is balanced and to determine periods of times over which the data traffic is imbalanced. The distributed data center system 104 may not use data samples 118 during region exit in the training process.

In some cases, the distributed data center system 104 can perform a measurement to determine the indices 128 that indicate a level of imbalance of the data traffic at the data centers 110. For example, for respective timestamps, t, from the weight-transformed data samples (e.g., $WT(v_i(t))$, i=1, . . . ,n (n=3)), there are weight-transformed data traffic values that indicate an amount of data traffic for respective data centers 110, which is described in further detail with respect to FIG. 6. The distributed data center system 104 can determine a degree of imbalance at respective timestamps by determining a distance between an ideal data traffic distribution (e.g., even traffic distribution) and the real-time data traffic distribution, which can be determined by the ground truth weight.

The distributed data center system 104 can use standard deviation to measure imbalance according to Equation 3:

$$imb(t) = std(\{WT(v_1(t), \dots, WT(v_n(t))\}), t \in [t_{start}, t_{end}]. \tag{3}$$

However, for a relatively large numerical quantity of data samples, using the standard deviation to detect data traffic imbalance may lead to inaccurate detections of imbalanced data traffic. Thus, the distributed data center system 104 can use an L1 distance when a numerical quantity of data centers 110 satisfies (e.g., exceeds, is greater than) a threshold value, where an L1 distance is a sum of the absolute differences between two values. For example, the distributed data center system 104 can determine whether the data traffic is balanced across data centers 110 according to Equation 4:

$$imb(t) = \frac{\sum_{i=1}^{n}\left|WT(v_i(t))\frac{1}{n}\right|}{n}, t \in [t_{start}, t_{end}]. \tag{4}$$

In some cases, such as if the data traffic is evenly distributed across the data centers 110, then a segment of weight-transformed data traffic that is a candidate for imbalance after partitioning the dataset, seg($t_{start}$, $t_{end}$), is balanced if the imbalance for a large proportion of times is within a threshold value from zero. We use time-series seg ($t_{start}$, $t_{end}$) to represent the weight-transformed traffic data within the time window from $t_{start}$ to $t_{end}$, and time-series imb(seg) to represent the time-series calculated by applying imb(t) on seg($t_{start}$, $t_{end}$) for each timestamp t.

The distributed data center system 104 can perform time-series splitting, Split(imb(seg), max_error), by fitting a time-series imb(seg) into sub-time-series of horizontal lines, indicating individual stages, which is described in further detail with respect to FIG. 7. For example, the distributed data center system 104 can loop through the weight-transformed data samples 118 to determine where to split the time-series into different segments or stages using a maximum error value, max_error. In some cases, rather than applying a k-split algorithm to split the dataset into k segments, max_error controls the number of segments by controlling the error value. The distributed data center system 104 can set a value of the max_error to a value that provides a sufficient numerical quantity of segments (e.g., greater than a threshold numerical quantity of segments) for different types of datasets, including different measures of irregularity, where 1 is an example value that a sufficient numerical quantity of segments for different types of datasets and 0.01 is a value that provides a sufficient numerical quantity of segments for a smooth dataset (e.g., a dataset with little to no irregularity). A greater value for the max_error parameter will result in a lower or smaller numerical quantity of segments.

In some examples, the data samples 118 can have a relatively high measure of irregularity during time periods of imbalanced data traffic. The distributed data center system 104 can mitigate or reduce the irregularity of the data samples 118 by introducing a factor to the data samples 118. For example, the distributed data center system 104 can measure the irregularities in a set of data samples 118 according to a frequency of sudden differences in data traffic and/or a scale of imbalance. The distributed data center system 104 determines the frequency according to Equation 5:

$$\text{frequency } (imb(seg)) = \frac{len(\text{Split}(imb(seg), 1e-4))}{len(imb(seg))}. \qquad (5)$$

The distributed data center system 104 determines the scale according to Equation 7:

$$\text{scale}(imb(seg)) = \frac{\max(imb(seg)) - \min(imb(seg))}{\max(imb(seg))}. \qquad (7)$$

The measure of irregularity is a function of the frequency and the scale (e.g., irregularity(imb(seg))=frequency (imb (seg))*scale(imb(seg)). In some cases, the distributed data center system 104 can set a value of max_error to a relatively small value (e.g., 0.0001) to split the time-series data into multiple segments (e.g., greater than a threshold numerical quantity of segments). The more segments, the higher the frequency of fluctuation in the time-series data. The scale of sudden differences in data traffic is measured by the maximum and minimum values of the time-series data. The irregularity is the product of the two factors.

In some examples, during training, the distributed data center system 104 can determine one or more baseline segments from the time-series splitting. The baseline segments can represent a period of time during which the data traffic is evenly distributed across the data centers 110. The distributed data center system 104 can select the baseline value using len(seg), avg(seg), std(seg), and irregularity (seg), or the result from previous executions as the seed. For baseline selection and increasing the data samples 118 in a training set, the distributed data center system 104 can use a calibration factor, c, as the constant controlled by the 3-sigma rule and irregularity according to Equation 8:

$$c = 1 - \text{irregularity}(seg). \qquad (8)$$

Higher irregularity in the segments may cause the result to have higher average and standard deviation values, making the upper bound of range avg(seg)+std(seg)*c exceed a threshold value, so that greater than a threshold numerical quantity of imbalance values are involved in the baseline as well as the training set. For selecting a baseline and growing a training dataset, the distribute data center system 104 can use the calibration factor to narrow a threshold for selecting other segments as part of the training dataset to reduce the impact from fluctuation in the training dataset.

For a selected baseline value, the distributed data center system 104 selects imbalance values from segments that satisfy avg(seg)∈[0, avg(base)+std(base)*c] and 0≤imb(t)≤avg(base)+std(base)*c. The distributed data center system 104 can determine the average and standard deviation of the training set, (avg(train), std(train)), and can fit a normal distribution upon (avg(train), std(train)) as a training result nd(train)=NormalDistribution(loc=avg(train), scale=std(train)).

In some examples, the distributed data center system 104 can use a cumulative distribution function (CDF) as an indicator of a degree of imbalance for a given timestamp, t, (e.g., cdf(imb(t))=nd(train).cdf(imb(t))). Applying time-series splitting to the time-series imb(t) can enlarge the gap between balanced and imbalanced segments. The distributed data center system 104 can use the time-series splitting to determine how many stages (e.g., segments) there are in the data samples 118 that are imbalanced, while applying CDF to a segment indicates a degree to which the segment is imbalanced. For example, the distributed data center system 104 can determine one or more indices 128 by applying a CDF to respective segments (e.g., avg_cdf(seg)=avg({cdf (imb($t_{start}$, $t_{end}$))}), where the indices 128 indicate a level or degree of imbalance for that segment.

In some cases, there can be multiple different values for the indices 128. For example, the distributed data center system 104 can assign the indices 128 to the segments using a 30-rule of normal distribution. The distributed data center system 104 can assign an index of one (e.g., Level 1 imbalance) if a CDF of the segment is less than a threshold and greater than another threshold (e.g., 0.6827≤avg_cdf (seg)<0.9545), can assign an index of two (e.g., Level 2 imbalance) if a CDF of the segment is greater than the other threshold and less than yet another threshold (e.g., 0.9545≤avg_cdf(seg)<0.9973), and/or can assign an index of three (e.g., Level 3 imbalance) if a CDF of the segment is greater than the other threshold (e.g., 0.9973≤avg_cdf (seg)), where avg_cdf(seg)=avg({cdf(imb(seg))}).

The distributed data center system 104 can determine a confidence factor (e.g., confidence score) for the indices 128. For example, the distributed data center system 104 can determine the confidence factor according to Equation 9:

$$cf(seg) = \left(1 - \frac{std(\{cdf(imb(seg))\})}{avg(\{cdf(imb(seg))\})}\right) * 100\%. \qquad (9)$$

The distributed data center system 104 measures an accuracy or confidence of the detection (e.g., a concentration of cdf(imb(seg)))).

In some examples, the distributed data center system 104 can store the indices 128 and/or the confidence scores at the data storage 120. The computing device 102-*b* can determine the indices 128 and/or the confidence scores in addition to, or as an alternative to, the distributed data center system 104. Additionally, or alternatively, the distributed data center system 104 can transmit a notification 130 to the computing device 102-*b* if one or more of the indices 128 exceeds a threshold value for an application 108 and/or the confidence score for the indices 128 satisfies a threshold value (e.g., exceeds, is greater than). The notification 130 can include a message indicating at least one index of the indices 128 fails to satisfy at least one threshold value (e.g., exceeds the threshold value, is greater than the threshold value). Additionally, or alternatively, the notification 130 can include instructions to cause display of a user interface that indicates the at least one index of the respective indices. The notification 130 is described in further detail with respect to FIG. 9.

The computing device 102-*a* and/or the computing device 102-*b* can receive user input via an I/O manager 132 and/or an I/O manager 134, respectively, that causes the computing device 102-*a* and/or the computing device 102-*b* to execute instructions, such as to cause the computing device 102-*a* and/or the computing device 102-*b* to transmit or receive data to and from the distributed data center system 104. For example, the computing device 102-*a* can receive user input via the user interface 112, and the I/O manager 132 triggers the computing device 102-*a* to transmit data to the distributed data center system 104. Additionally, or alternatively, the I/O manager 132 and/or the I/O manager 134 may configure the computing device 102-*a* and the computing device 102-*b* to display, or otherwise present, controls that are selectable by a user to provide user input and/or prompts requesting user input. In some examples, the I/O manager 132 and the I/O manager 134 display the controls and/or prompts to the user via a graphical user interface (GUI) of a computing device 102-*a* or a computing device 102-*b* (e.g., via the user interface 112 or a user interface of the computing device 102-*b*). For example, the I/O manager 134 can display the notification 130 via a user interface of the computing device 102-*b*. In some other examples, the I/O manager 132 and/or the I/O manager 134 display the request to the user via a GUI of another device communicatively coupled with the computing device 102-*a* or the computing device 102-*b* (e.g., another computing device coupled via the networks 106). The I/O manager 132 and/or the I/O manager 134 can visually display the controls and/or the prompts (e.g., the notification 130 and/or features of the application 108), can emit an audio version of the controls and/or the prompts via an audio output component, or the like.

In some examples, the I/O manager 134 can cause the computing device 102-*b* to display a user interface with one or more controls selectable by a user (e.g., to provide user input). The computing device 102-*b* can receive user input via the controls that indicates for the computing device 102-*b* to request for the distributed data center system 104 to modify a data traffic distribution to the data centers 110. The computing device 102-*b* can transmit the request to the distributed data center system 104 (e.g., via the communications manager 126), and the distributed data center system 104 can update the data traffic to the data centers 110, accordingly. The modification can cause the index to satisfy the threshold value (e.g., be less than a threshold level of imbalance). In some other examples, the computing device 102-*b* and/or the distributed data center system 104 can perform troubleshooting to determine a cause of the imbalance and can determine one or more modifications to the data traffic (e.g., independent of user input).

The distributed data center system 104 may implement the load balancer 114, the data sample manager 116, and the communications manager 122 by using servers that execute stored instructions to deploy various services of the distributed data center system 104, such that those services perform numerous computations which are effective to provide the functionality described above and below. It is to be appreciated that the distributed data center system 104, the computing device 102-*a*, and the computing device 102-*b*, may include more, fewer, or different components without departing from the spirit or scope described herein.

Figure 2:
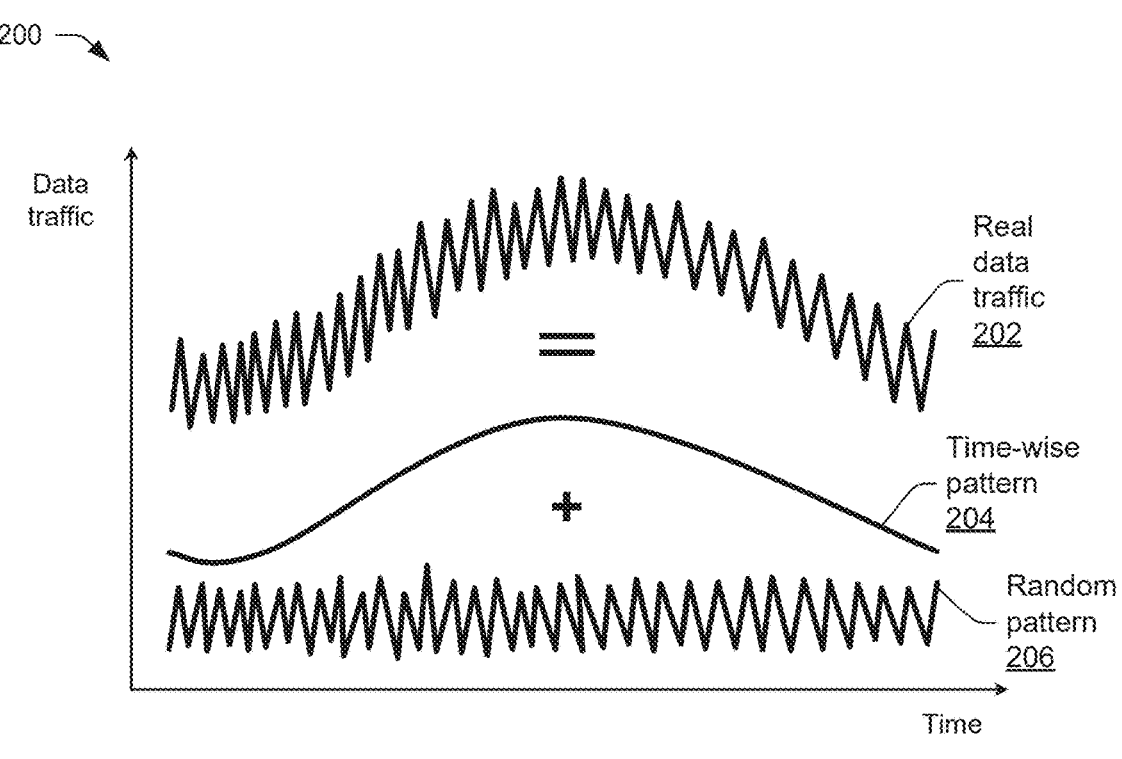
FIGS. 2, 3, and 4 depict example diagrams of data traffic for multiple data centers in a distributed data center system.

Having considered an example of an environment, consider now a discussion of some example details of the techniques for data traffic balancing for distribute data centers in accordance with one or more implementations.
Detecting Imbalanced Data Traffic for Multiple Data Centers FIG. 2 depicts an example diagram 200 of data traffic for multiple data centers in a distributed data center system. The diagram 200 can be implemented by aspects of the environment 100. For example, the diagram 200 can be implemented by a distributed data center system 104, as described with reference to FIG. 1.

The diagram 200 includes an example of data samples (e.g., the data samples 118, as described with reference to FIG. 1), which can be representative of data traffic for a data center over time. The time interval can include a historical time to a present time (e.g., current time), such that the diagram 200 illustrates an example of real data traffic 202 in real-time for a single data center.

The data samples can include patterns and/or trends, including a time-wise pattern 204 and a random pattern 206. The real data traffic 202 includes the time-wise pattern 204 and the random pattern 206. The time-wise pattern can include fluctuations in the values of the data samples over a period of time (e.g., a periodic period of time or an irregular period of time). The random pattern can include fluctuations in the values of the data samples that do not follow a time-wise pattern.

Figure 3:
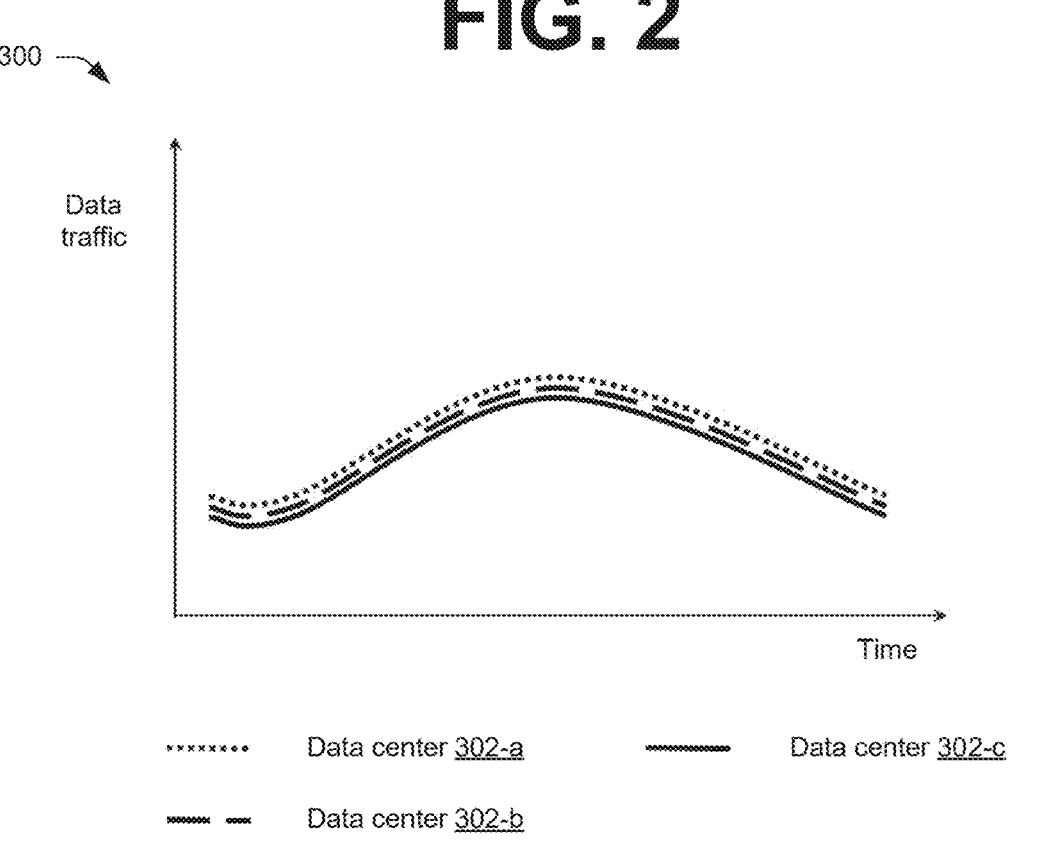

FIG. 3 depicts an example diagram 300 of data traffic for multiple data centers in a distributed data center system. The diagram 300 can be implemented by aspects of the environment 100 and/or the diagram 200. For example, the diagram 300 can be implemented by a distributed data center system 104, as described with reference to FIG. 1.

The diagram 300 includes an example of a distribution of data traffic across data centers according to weighted data samples (e.g., data samples 118, as described with reference to FIG. 1). For example, the diagram 300 illustrates an example of weighted data traffic for three data centers, including a data center 302-*a*, a data center 302-*b*, and a data center 302-*c*. A distributed data center system can include the data center 302-*a* through the data center 302-*c*. A load balancer can distribute the data traffic to the data center 302-*a* through the data center 302-*c*. The load balancer can attempt to distribute the data traffic evenly across the data center 302-*a*, the data center 302-*b*, and the data center 302-*c*. However, the real data traffic can include a weighted distribution of the data traffic when the data traffic is balanced across the data center 302-*a*, the data center 302-*b*, and the data center 302-*c*. For example, the distribution of total data traffic for a distributed data center system 104 with three data centers can include a distribution with weight factors of 36%, 32%, and 32% for three data centers, respectively. The weighted distribution of the total data traffic is illustrated in the diagram 300. Although the diagram 300 illustrates an example of data traffic across three data centers, the data traffic can be distributed across any numerical quantity of data centers.

Figure 4:
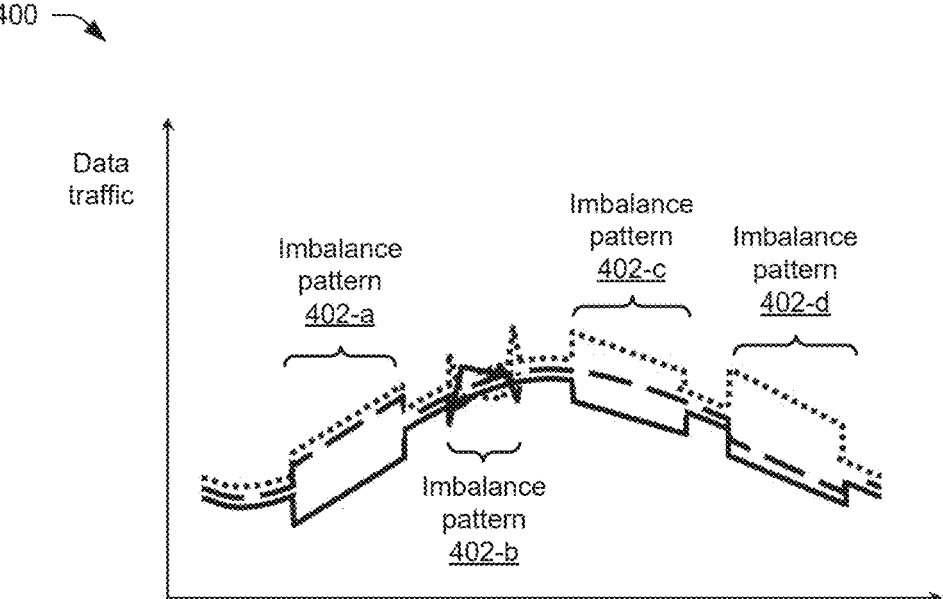

FIG. 4 depicts an example diagram 400 of data traffic for multiple data centers in a distributed data center system. The diagram 400 can be implemented by aspects of the environment 100, the diagram 200, and/or the diagram 300. For example, the diagram 400 can be implemented by a distributed data center system 104, as described with reference to FIG. 1.

The diagram 400 includes an example of different patterns of an imbalanced distribution of data traffic across data centers. For example, the diagram 300 illustrates an example of imbalanced data traffic for three data centers, including a data center 302-*a*, a data center 302-*b*, and a data center 302-*c*. A distributed data center system can include the data center 302-*a* through the data center 302-*c*. A load balancer can distribute the data traffic to the data center 302-*a* through the data center 302-*c*. The load balancer can attempt to distribute the data traffic evenly across the data center 302-*a*, the data center 302-*b*, and the data center 302-*c*. However, the real data traffic can include imbalances, which can be caused by changes to the infrastructure of a computing device implementing an application, an application, and/or to a distributed data center system (e.g., a load balancer or a component of a data center). The changes can be due to environmental factors, component failure, security factors, or maintenance, among others. For example, an environmental factor (e.g., fire, storm, flood) can cause a server in a data center to fail and/or can cause networks to become unavailable. Additionally, or alternatively, a load balancer or an application may not be operable during maintenance or due to a failure.

There may be different types of imbalances in the real data traffic. For example, an imbalance pattern 402-*a* can include a data center 302-*a* and a data center 302-*b* receiving additional data traffic, while the data center 302-*c* receives less data traffic. An imbalance pattern 402-*b* can include a data center 302-*a*, a data center 302-*b*, and a data center 302-*c* receiving irregular and/or random amounts of data traffic. An imbalance pattern 402-*c* can result in a data center 302-*a* receiving additional data traffic, the data center 302-*b* maintaining an amount of data traffic, and a data center 302-*c* receiving less data traffic. An imbalance pattern 402-*d* can result in a data center 302-*a* receiving additional data traffic while the data center 302-*b* and the data center 302-*c* receive less data traffic.

If the data traffic is imbalanced, then the distribution of data traffic may not follow a weight factor. For example, an increment in data traffic of one data center results in the two other data center receiving less data traffic. The imbalance pattern 402-*a*, the imbalance pattern 402-*c*, and the imbalance pattern 402-*d* can be classified into a stationary imbalance category, while the imbalance pattern 402-*b* can be classified into an irregular imbalance category. For example, a stationary imbalance can include a constant proportion of data traffic distributed among data centers. The data traffic can move (e.g., be redistributed) from one data center to the other two data centers, from one data center to another data center, or from two data centers to the other data center. An irregular imbalance can result when data traffic is shifting among data centers without apparent patterns (e.g., at a relatively high frequency).

Although the diagram 400 illustrates an example of data traffic across three data centers, the data traffic can be distributed across any numerical quantity of data centers.

Figure 5:
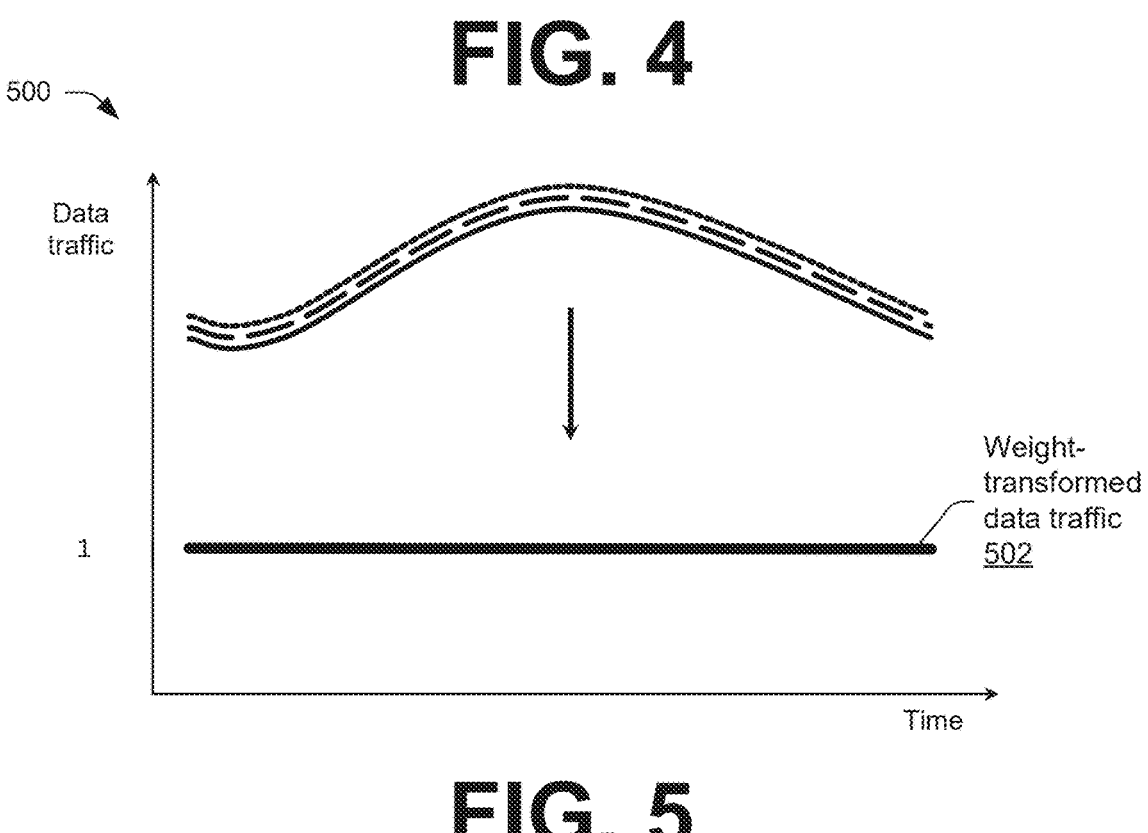

FIG. 5 depicts an example diagram 500 of weight-transformed data traffic for multiple data centers in a distributed data center system. The diagram 500 can be implemented by aspects of the environment 100, the diagram 200, the diagram 300, and/or the diagram 400. For example, the diagram 500 can be implemented by a distributed data center system 104, as described with reference to FIG. 1.

The diagram 500 includes an example of weight-transformation of weighted data traffic for different data centers without imbalanced data traffic. For example, the weight-transformed data traffic 502 for a data center 302-*a* through a data center 302-*c* can have a value of one, which indicates that the data traffic is balanced. A distributed data center system and/or a computing device can weight-transform the weighted data traffic (e.g., weighted data samples 118) according to Equation 2. The weights can be based on a real balanced distribution of the data traffic, as described with reference to FIG. 3.

Although the diagram 500 illustrates an example of weight-transforming weighted data traffic across three data centers, the data traffic can be distributed across any numerical quantity of data centers.

FIG. 6 depicts an example diagram 600 of weight-transformed data traffic for multiple data centers in a distributed data center system. The diagram 600 can be implemented by aspects of the environment 100, the diagram 200, the diagram 300, the diagram 400, and/or the diagram 500. For example, the diagram 600 can be implemented by a distributed data center system 104, as described with reference to FIG. 1.

The diagram 600 includes an example of weight-transformation of weighted data traffic for different data centers with imbalanced data traffic. For example, the weight-transformed data traffic for a data center 302-*a* through a data center 302-*c* can have a value of one for periods of time that the data traffic is balanced but can have a value other than one for periods of time that the data traffic is imbalanced. A distributed data center system and/or a computing device can weight-transform the data traffic (e.g., weighted data samples 118) according to Equation 2. The weights can be based on a real balanced distribution of the data traffic, as described with reference to FIG. 3.

Although the diagram 600 illustrates an example of weight-transforming data traffic across three data centers, the data traffic can be distributed across any numerical quantity of data centers.

FIG. 7 depicts an example diagram 700 of an example diagram of a time-series splitting of weight-transformed data traffic for multiple data centers in a distributed data center system. The diagram 700 can be implemented by aspects of the environment 100, the diagram 200, the diagram 300, the diagram 400, the diagram 500, and/or the diagram 600. For example, the diagram 700 can be implemented by a distributed data center system 104, as described with reference to FIG. 1.

The diagram 700 includes an example of a time-series splitting of weight-transformed data traffic for different data centers with imbalanced data traffic. For example, a distributed data center system can determine segments of imbalance and/or balance using the weight-transformed data traffic for a data center 302-*a* through a data center 302-*c*. The distributed data center system can be assigned different values for different time periods or intervals that have distinct values. A distributed data center system can determine the time intervals according to statistical characteristics of the weight-transformed data traffic (e.g., using standard deviation and/or L1 measurements), as described with reference to FIG. 1.

Figure 8:
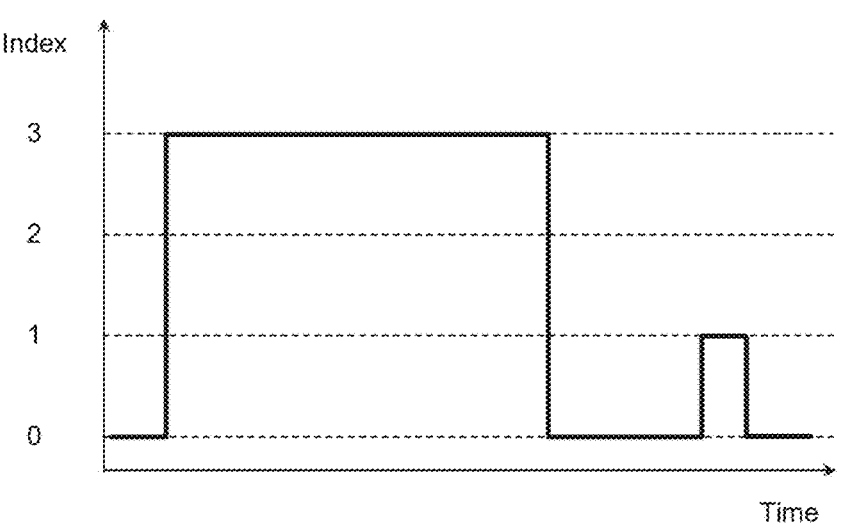
FIG. 8 depicts an example diagram of indices obtained from data traffic for multiple data centers in a distributed data center system.

FIG. 8 depicts an example diagram 800 of indices obtained from data traffic for multiple data centers in a distributed data center system. The diagram 800 can be implemented by aspects of the environment 100, the diagram 200, the diagram 300, the diagram 400, the diagram 500, the diagram 600, and/or the diagram 700. For example, the diagram 800 can be implemented by a distributed data center system 104, as described with reference to FIG. 1.

The diagram 800 includes an example of assigning different index values to time-series segments for data samples (e.g., the data samples 118, as described with reference to FIG. 1) that have been weight-transformed and time-series split according to the techniques as described with reference to FIGS. 1 through 7. For example, an index of three can indicate that the level of imbalance is relatively high. A level of imbalance that is relatively high means that the data traffic is not evenly distributed across the data centers. An index of zero can indicate that the data traffic is balanced (e.g., evenly distributed across the data centers). The index can be assigned based on one or more threshold values selected by the distributed data center system and/or indicated by a user (e.g., a user of the computing device 102-*b*, as described with reference to FIG. 1).

Figure 9:
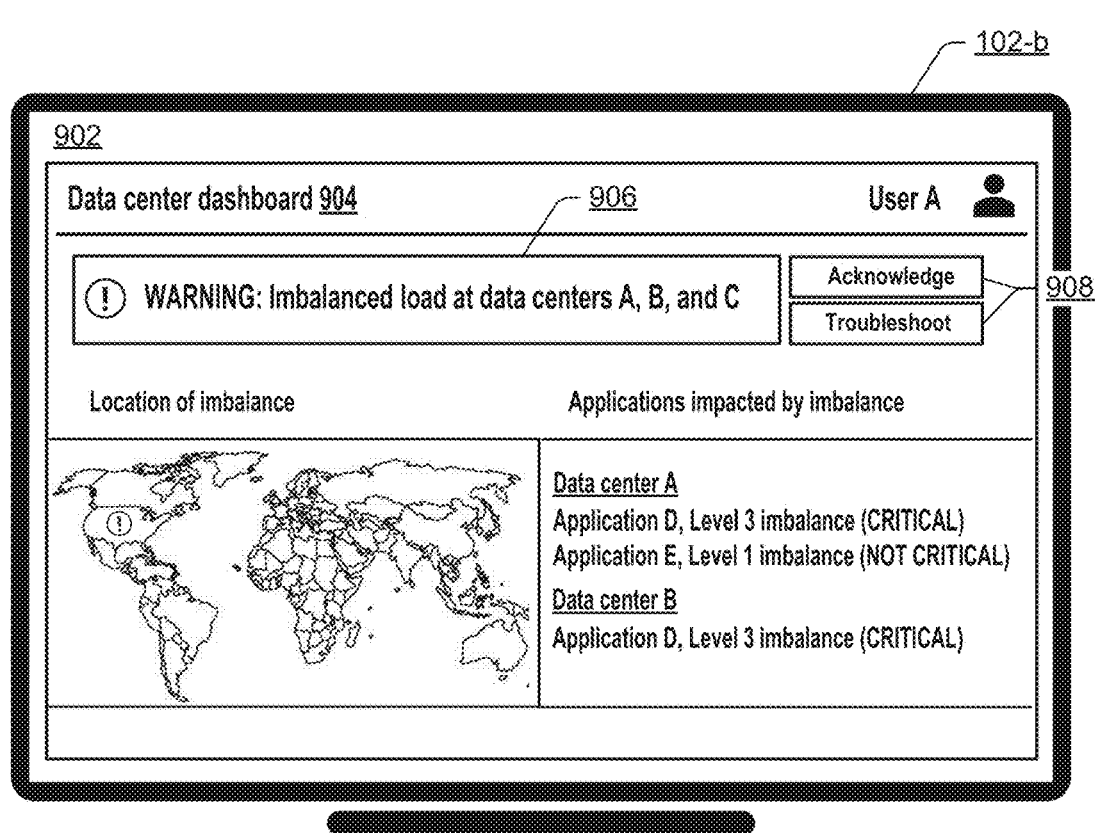
FIG. 9 depicts an example implementation of a notification related to data traffic at data centers in a distributed data center system.

FIG. 9 depicts an example 900 implementation of a notification related to data traffic at data centers in a distributed data center system. The example 900 can be implemented by aspects of the environment 100, the diagram 200, the diagram 300, the diagram 400, the diagram 500, the diagram 600, the diagram 700, and/or the diagram 800. For example, the example 900 can be implemented by a computing device 102-b, as described with reference to FIG. 1.

The example 900 includes a user interface 902 of a computing device 102-b. The user interface 902 can be an example of a GUI. The computing device 102-b can receive a notification from a distributed data center system that indicates an imbalanced data traffic distribution at one or more data centers. Additionally, or alternatively, the computing device 102-b can receive data samples and/or indices from the distributed data center system and can detect an imbalanced data traffic distribution from the data samples and/or the indices. The data traffic can be related to an application running at another computing device and/or at the computing device 102-b.

In some examples, the notification can include a message indicating an index of a time-series segment satisfies (e.g., exceeds, is greater than) a threshold level of imbalance. The threshold level of imbalance can depend on the application and/or the data being distributed across the data centers. For example, the application can be a critical application (a health services application, a transportation application, a financial application, etc.) that is sensitive to latency and/or degradation of performance. For critical applications, the threshold level of imbalance can be relatively low (e.g., one or two). Thus, a minor imbalance to the data traffic distribution can cause the distributed data center system to notify the computing device 102-b of the imbalance.

In some other examples, the application may not be a critical application, and thus may not be sensitive to latency and/or degradation of performance. For applications that are not critical, the threshold level of imbalance can be relatively high (e.g., three or greater). Thus, a minor imbalance to the data traffic distribution may not cause the distributed data center system to notify the computing device 102-b of the imbalance or may cause the distributed data center system to wait for a threshold duration and/or for a defined time period to notify the computing device 102-b. For example, the distributed data center system can refrain from notifying the computing device 102-b of an imbalance for an application that is not critical and/or if the threshold level of imbalance is relatively low for a threshold duration and can determine whether the imbalance has been corrected without manual interference. Additionally, or alternatively, the distributed data center system can wait to notify the computing device 102-b of the imbalance until a defined period of time (e.g., periodically, at a same time every day, or any other period of time).

In some cases, the notification can include instructions to cause the computing device 102-b to display an indication that an index of a time-series segment satisfies a threshold level of imbalance. For example, the computing device 102-b can implement a data center dashboard 904 for a user (e.g., User A). The data center dashboard 904 can provide for the user of the computing device 102-b to monitor data distribution across data centers in a distributed data center system. The data center dashboard 904 can display a message 906 that indicates an imbalance is detected. For example, the computing device 102-b can receive the notification from the distributed data center system and can display a message 906 "WARNING: Imbalanced load at data centers A, B, and C." In some examples, the text included in the message 906 can be based on a value of the index (e.g., a higher index can result in a more urgent warning) and/or based on whether the applications served by the data centers are critical or not critical (e.g., a critical application can have a more urgent warning).

In some examples, the data center dashboard 904 can include one or more controls 908 selectable by a user to cause the computing device 102-b to perform one or more actions. For example, the controls 908 can include a control 908 labeled with "Acknowledge" to confirm the imbalanced load at data centers A, B, and C. Selection of the control 908 labeled with "Acknowledge" causes the computing device 102-b to remove the message 906 from the data center dashboard 904. Additionally, or alternatively the data center dashboard 904 includes a control 908 labeled with "Troubleshoot" to initiate a diagnostics and correction procedure for determining a cause of the imbalance and a corrective action for the imbalance. Selection of the control 908 labeled with "Troubleshoot" causes the computing device 102-b to transmit a message to the distributed data center system requesting additional information related to the imbalanced load (e.g., data traffic distribution) at the data centers A, B, and C. For example, the additional information can include, but is not limited to, a network connectivity status (e.g., connected or not connected, a strength of the connection, a quality of the connection, among other performance metrics for the connection) at one or more components of the data centers, a maintenance status of the components of the data centers (e.g., under maintenance, not under maintenance, being repaired, failure, among other examples), a maintenance status of the application (e.g., migration or integration schedules, among other examples), the data samples, an indication of computational resource usage at the respective data centers, among other information.

In some cases, the data center dashboard 904 can display a location of the imbalance, such as a geographic location of the data centers impacted by the imbalance. Additionally, or alternatively, the data center dashboard 904 can display a list of applications impacted by the imbalance. The list of applications impacted by the imbalance can include the applications supported by respective data centers (e.g., an Application D and an Application E for Data center A, or an Application D for Data center B). Additionally, or alternatively, the list of applications impacted by the imbalance can include an index of the imbalance (e.g., Level 1 through Level 3), as well as an indication of whether the application is critical or not critical.

In some examples, the computing device 102-b can automatically (e.g., without user input) troubleshoot the imbalanced data traffic distribution. For example, the computing device 102-b can request the additional information from the distributed data center system upon receiving the notification and/or the distributed data center system can transmit the additional information to the computing device 102-b with the notification. The computing device 102-b and/or a user of the computing device 102-b can analyze the additional information to identify a root cause of the imbalanced data traffic distribution. There can be an error that is the root cause of the imbalanced data traffic distribution, which can occur at the application layer, load balancer layer, or any other layer of the distributed data center system. Whether the computing device 102-b automatically troubleshoots the imbalanced data traffic distribution can be configured by a user (e.g., linked to a user profile or user account) and/or can be otherwise defined.

In some examples, a user can provide input that indicates a modification to the data traffic distribution to correct the imbalance and/or to address the root cause of the imbalance. Additionally, or alternatively, such as if the computing device 102-b automatically troubleshoots the imbalanced data traffic distribution and/or identifies the root cause, the computing device 102-b can determine a modification to the data traffic distribution to correct the imbalance and/or to address the root cause of the imbalance. For example, if the root cause of the imbalance is maintenance at a data center that is scheduled for a period of time, then the computing device 102-*b* and/or the user can provide a modification to the data traffic distribution to the data centers over that period of time to route traffic away from that data center and to other data centers in the distributed data center system. The computing device 102-*b* can transmit instructions to the distributed data center system to redistribute the data traffic according to the indicated modification. The distributed data center system can implement the modification, such as by increasing a data traffic distribution to a data center and reducing a data distribution to another data center, or any other modification to the amount of data traffic distributed to respective data centers. The distributed data center system can modify the data traffic distributions, such that the data traffic is distributed evenly (e.g., balanced) across the data centers.

Having discussed exemplary details of detecting imbalances in data traffic for distributed data centers, consider now some examples of procedures to illustrate additional aspects of the techniques.

Example Procedures

This section describes examples of procedures for detecting imbalances in data traffic for distributed data centers. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

FIG. 10 depicts a procedure 1000 in an example implementation of detecting imbalances in data traffic for distributed data centers. Aspects described as being performed by a distributed data center system can additionally, or alternatively, be performed by a computing device.

At 1002, a set of data samples corresponding to respective data traffic at data centers is obtained. The respective data traffic are based on data associated with an application. For example, a distributed data center system can obtain data samples representative of data traffic over a time period. The time period can span from a historical time period to a current time period (e.g., real-time). A computing device can receive user input configuring the historical time period and/or the historical time period can be preconfigured or defined.

In some cases, the data traffic can be distributed by a load balancer of the distributed data center system. For example, the distributed data center system can receive data from a computing device that is related to an application. The distributed data center system can route the data via the load balancer to the data centers. The data traffic can include data traffic for one or more applications, including, but not limited to, user data, transaction data, communications data, media content data, among other data.

In some examples, obtaining the set of data samples can include receiving respective reports including the set of data samples from the data centers. Additionally, or alternatively, obtaining the set of data samples can include receiving information that indicates the data samples from the load balancer. For example, the load balancer can obtain the set of data samples by storing the set of data samples when routing the data related with the application to the data centers.

At 1004, subsets of weight-transformed data samples associated with respective intervals of time are generated based on a set of weight-transformed data samples corresponding to the set of data samples. A subset of weight-transformed data samples of the subsets of weight-transformed data samples corresponds to a balanced state associated with the respective data traffic at the data centers. For example, a distributed data center system can time-series split weight-transformed data samples to determine one or more segments (e.g., stages, subsets) of weight-transformed data samples. In some cases, the balanced state is based on the respective data traffic at the data centers satisfying respective threshold values that are determined based on computing resources available at the plurality of data centers. For example, the data traffic at the data centers may be balanced if the data centers are not using more than the computing resources available to the data centers. Additionally, or alternatively, the data traffic can be balanced if the data traffic is distributed evenly across the data centers.

In some examples, the distributed data center system can determine the subsets of weight-transformed data samples by comparing differences between weight-transformed data samples in the set of weight-transformed data samples to one or more threshold values. In some cases, the respective intervals of time are defined by the differences between the weight-transformed data samples satisfying the one or more threshold values.

At 1006, respective indices associated with the subsets of weight-transformed data samples are generated. In some cases, the respective indices indicate at least one of the balanced state associated with the respective data traffic at the data centers or an imbalanced state associated with the respective data traffic at the data centers. For example, the distributed data center system can determine one or more indices that are representative of imbalance levels of the subsets of weight-transformed data samples, where an index value of zero indicates that the data traffic is balanced across the data centers and any index value greater than zero indicates that the data traffic is imbalanced across the data centers. In some examples, the index values can be integer values. There may be any numerical quantity of index values that the distributed data center system can assign to the subsets of weight-transformed data samples. The indices can be based on threshold values, such that the index value for a subset can satisfy one or more threshold values (e.g., be greater than a threshold value but less than another threshold value).

For example, the imbalanced state is based on the respective data traffic at the data centers failing to satisfy respective threshold values. The threshold values can be determined based on computing resources available at the plurality of data centers. The data traffic at the data centers may be imbalanced if the data centers are attempting to use more than the computing resources available to the data centers or are using less than the computing resources available to the data centers. Additionally, or alternatively, the data traffic can be imbalanced if the data traffic is not distributed evenly across the data centers.

In some examples, the distributed data center system determines a respective calibration value to apply to the respective indices. The calibration value can be based on a respective frequency value and a respective scale value of the subsets of weight-transformed data samples. For example, the distributed data center system can determine to calibrate the indices if a measure of irregularity of the data samples satisfies a threshold value. The distributed data center system can apply the respective calibration value to the respective indices.

At 1008, a message is transmitted indicating at least one index of the respective indices fails to satisfy at least one threshold value. In some cases, the at least one index is associated with at least one subset of weight-transformed data samples. For example, the distributed data center system can transmit the message to a computing device. The distributed data center system can receive instructions from the computing device indicating a modification to data traffic for at least one data center. The modification to the data traffic can result in least one updated index satisfying the at least one threshold value.

In some cases, the distributed data center system can transmit the message if a confidence score associated with the at least one index satisfies a threshold value. For example, the distributed data center system can compute a confidence score (e.g., as a percentage) that indicates an accuracy of the index. If the confidence score for the index fails to satisfy a threshold value, then the distributed data center system can refrain from transmitting the message. If the confidence score satisfies the threshold value, then the distributed data center system can transmit the message to the computing device. The confidence score can be based on one or more statistical characteristics of the at least one subset of weight-transformed data samples. The statistical characteristics can include a standard deviation of a CDF of the segment and/or an average of the CDF of the segment.

FIG. 11 depicts a procedure 1100 in an example implementation of detecting imbalances in data traffic for distributed data centers. Aspects described as being performed by a distributed data center system can additionally, or alternatively, be performed by a computing device.

At 1102, a set of data samples corresponding to respective data traffic at data centers is obtained. The respective data traffic are based on data associated with an application. For example, a distributed data center system can obtain data samples representative of data traffic over a time period. The time period can span from a historical time period to a current time period (e.g., real-time). A computing device can receive user input configuring the historical time period and/or the historical time period can be preconfigured or defined.

In some cases, the data traffic can be distributed by a load balancer of the distributed data center system. For example, the distributed data center system can receive data from a computing device that is related to an application. The distributed data center system can route the data via the load balancer to the data centers. The data traffic can include data traffic for one or more applications, including, but not limited to, user data, transaction data, communications data, media content data, among other data.

In some examples, obtaining the set of data samples can include receiving respective reports including the set of data samples from the data centers. Additionally, or alternatively, obtaining the set of data samples can include receiving information that indicates the data samples from the load balancer. For example, the load balancer can obtain the set of data samples by storing the set of data samples when routing the data related with the application to the data centers.

At 1104, subsets of weight-transformed data samples associated with respective intervals of time are generated based on a set of weight-transformed data samples corresponding to the set of data samples. A subset of weight-transformed data samples of the subsets of weight-transformed data samples corresponds to a balanced state associated with the respective data traffic at the data centers. For example, a distributed data center system can time-series split weight-transformed data samples to determine one or more segments (e.g., stages, subsets) of weight-transformed data samples. In some cases, the balanced state is based on the respective data traffic at the data centers satisfying respective threshold values that are determined based on computing resources available at the plurality of data centers. For example, the data traffic at the data centers may be balanced if the data centers are not using more than the computing resources available to the data centers. Additionally, or alternatively, the data traffic can be balanced if the data traffic is distributed evenly across the data centers.

In some examples, the distributed data center system can determine the subsets of weight-transformed data samples by comparing differences between weight-transformed data samples in the set of weight-transformed data samples to one or more threshold values. In some cases, the respective intervals of time are defined by the differences between the weight-transformed data samples satisfying the one or more threshold values.

At 1106, respective indices associated with the subsets of weight-transformed data samples are generated. In some cases, the respective indices indicate at least one of the balanced state associated with the respective data traffic at the data centers or an imbalanced state associated with the respective data traffic at the data centers. For example, the distributed data center system can determine one or more indices that are representative of imbalance levels of the subsets of weight-transformed data samples, where an index value of zero indicates that the data traffic is balanced across the data centers and any index value greater than zero indicates that the data traffic is imbalanced across the data centers. In some examples, the index values can be integer values. There may be any numerical quantity of index values that the distributed data center system can assign to the subsets of weight-transformed data samples. The indices can be based on threshold values, such that the index value for a subset can satisfy one or more threshold values (e.g., be greater than a threshold value but less than another threshold value).

For example, the imbalanced state is based on the respective data traffic at the data centers failing to satisfy respective threshold values. The threshold values can be determined based on computing resources available at the plurality of data centers. The data traffic at the data centers may be imbalanced if the data centers are attempting to use more than the computing resources available to the data centers or are using less than the computing resources available to the data centers. Additionally, or alternatively, the data traffic can be imbalanced if the data traffic is not distributed evenly across the data centers.

In some examples, the distributed data center system determines a respective calibration value to apply to the respective indices. The calibration value can be based on a respective frequency value and a respective scale value of the subsets of weight-transformed data samples. For example, the distributed data center system can determine to calibrate the indices if a measure of irregularity of the data samples satisfies a threshold value. The distributed data center system can apply the respective calibration value to the respective indices.

At 1108, instructions are transmitted to cause display of a user interface that indicates at least one index of the respective indices. In some cases, the at least one index is associated with at least one subset of weight-transformed data samples of the subsets of weight-transformed data samples, and the at least one index fails to satisfy at least one threshold value. For example, the distributed data center system can transmit the instructions to the computing device. The distributed data center system can receive instructions from the computing device indicating a modification to data traffic for at least one data center. The modification to the data traffic can result in least one updated index that satisfies the at least one threshold value.

In some cases, the distributed data center system can transmit the instructions if a confidence score associated with the at least one index satisfies a threshold value. For example, the distributed data center system can compute a confidence score (e.g., as a percentage) that indicates an accuracy of the index. If the confidence score for the index fails to satisfy a threshold value, then the distributed data center system can refrain from transmitting the instructions. If the confidence score satisfies the threshold value, then the distributed data center system can transmit the instructions to the computing device. The confidence score can be based on one or more statistical characteristics of the at least one subset of weight-transformed data samples. The statistical characteristics can include a standard deviation of a CDF of the segment and/or an average of the CDF of the segment.

In some examples, the distributed data center system can receive a request for information from the computing device. The request can be received at a user interface of the computing device. The information can correspond to the respective data traffic at the plurality of data centers. For example, the information can include, but is not limited to, the data corresponding to the application, the set of data samples, a status associated with respective data centers of the plurality of data centers, or an indication of computational resource usage associated with the respective data centers. The distributed data center system can transmit the information to the computing device.

Having described examples of procedures in accordance with one or more implementations, consider now an example of a system and device that can be utilized to implement the various techniques described herein.
Example System and Device FIG. 12 illustrates an example of a system generally at 1200 that includes an example of a computing device 1202 that is representative of one or more computing systems and/or devices that may implement the various techniques described herein. This is illustrated through inclusion of the application 108 and the distributed data center system 104. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interfaces 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware elements 1210 that may be configured as processors, functional blocks, and so forth. This may include implementation in hardware as an application specific integrated circuit or other logic device formed using one or more semiconductors. The hardware elements 1210 are not limited by the materials from which they are formed, or the processing mechanisms employed therein. For example, processors may be comprised of semiconductor(s) and/or transistors (e.g., electronic integrated circuits (ICs)). In such a context, processor-executable instructions may be electronically executable instructions.

The computer-readable media 1206 is illustrated as including memory/storage 1212. The memory/storage 1212 represents memory/storage capacity associated with one or more computer-readable media. The memory/storage 1212 may include volatile media (such as random-access memory (RAM)) and/or nonvolatile media (such as read only memory (ROM), Flash memory, optical disks, magnetic disks, and so forth). The memory/storage 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive, or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable, and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A computer-implemented method comprising:
   obtaining a set of data samples corresponding to respective data traffic at a plurality of data centers;
   generating, based on a set of weight-transformed data samples corresponding to the set of data samples, a plurality of subsets of weight-transformed data samples associated with respective intervals of time, wherein a subset of weight-transformed data samples of the plurality of subsets of weight-transformed data samples corresponds to a balanced state associated with the respective data traffic at the plurality of data centers;
   generating respective indices associated with the plurality of subsets of weight-transformed data samples, the respective indices indicating at least one of the balanced state associated with the respective data traffic at the plurality of data centers or an imbalanced state associated with the respective data traffic at the plurality of data centers; and
   transmitting a message indicating at least one index of the respective indices failing to satisfy at least one threshold value, the at least one index being associated with at least one subset of weight-transformed data samples of the plurality of subsets of weight-transformed data samples.

2. The computer-implemented method of claim 1, wherein obtaining the set of data samples comprises receiving, from the plurality of data centers, respective reports including the set of data samples.

3. The computer-implemented method of claim 1, further comprising:
   receiving, from at least one computing device, data associated with an application, wherein the respective data traffic is based on the data; and routing the data associated with the application to the plurality of data centers, the set of data samples corresponding to an amount of the data associated with the application routed to respective data centers of the plurality of data centers.

4. The computer-implemented method of claim 3, wherein obtaining the set of data samples comprises storing the set of data samples based on the routing the data associated with the application to the plurality of data centers.

5. The computer-implemented method of claim 1, further comprising determining the plurality of subsets of weight-transformed data samples based on comparing differences between weight-transformed data samples in the set of weight-transformed data samples to one or more threshold values, the respective intervals of time being associated with the differences between the weight-transformed data samples in the set of weight-transformed data samples satisfying the one or more threshold values.

6. The computer-implemented method of claim 1, wherein the balanced state associated with the respective data traffic at the plurality of data centers is based on the respective data traffic at the plurality of data centers satisfying respective threshold values associated with computing resources available at the plurality of data centers.

7. The computer-implemented method of claim 1, wherein the imbalanced state associated with the respective data traffic at the plurality of data centers is based on data traffic associated with at least one data center of the plurality of data centers failing to satisfy at least one respective threshold value associated with computing resources available for the at least one data center.

8. The computer-implemented method of claim 1, further comprising receiving, responsive to the message, instructions corresponding to a modification to data traffic associated with at least one data center of the plurality of data centers, the modification to the data traffic associated with the at least one data center corresponding to at least one updated index associated with the at least one subset of weight-transformed data samples that satisfies the at least one threshold value.

9. The computer-implemented method of claim 1, wherein generating the respective indices associated with the plurality of subsets of weight-transformed data samples comprises:

determining a respective calibration value associated with the respective indices based on a respective frequency value and a respective scale value of the plurality of subsets of weight-transformed data samples; and applying the respective calibration value to the respective indices.

10. The computer-implemented method of claim 1, wherein transmitting the message comprises determining a confidence score associated with the at least one index of the respective indices satisfies a threshold value, the confidence score being based on one or more statistical characteristics of the at least one subset of weight-transformed data samples.

11. A system comprising:

one or more processors; and a computer-readable storage medium storing instructions that are executable by the one or more processors to perform operations comprising:

obtaining a set of data samples corresponding to respective data traffic at a plurality of data centers;

generating, based on a set of weight-transformed data samples corresponding to the set of data samples, a plurality of subsets of weight-transformed data samples associated with respective intervals of time, wherein a subset of weight-transformed data samples of the plurality of subsets of weight-transformed data samples corresponds to a balanced state associated with the respective data traffic at the plurality of data centers;

generating respective indices associated with the plurality of subsets of weight-transformed data samples, the respective indices indicating at least one of the balanced state associated with the respective data traffic at the plurality of data centers or an imbalanced state associated with the respective data traffic at the plurality of data centers; and transmitting a message indicating at least one index of the respective indices failing to satisfy at least one threshold value, the at least one index being associated with at least one subset of weight-transformed data samples of the plurality of subsets of weight-transformed data samples.

12. The system of claim 11, wherein to obtain the set of data samples, the operations further comprise receiving, from the plurality of data centers, respective reports including the set of data samples.

13. The system of claim 11, wherein the operations further comprise:

receiving, from at least one computing device, data associated with an application, wherein the respective data traffic is based on the data; and routing the data associated with the application to the plurality of data centers, the set of data samples corresponding to an amount of the data associated with the application routed to respective data centers of the plurality of data centers.

14. The system of claim 11, wherein the operations further comprise determining the plurality of subsets of weight-transformed data samples based on comparing differences between weight-transformed data samples in the set of weight-transformed data samples to one or more threshold values, the respective intervals of time being associated with the differences between the weight-transformed data samples in the set of weight-transformed data samples satisfying the one or more threshold values.

15. A computer-implemented method comprising:

obtaining a set of data samples corresponding to respective data traffic at a plurality of data centers;

generating, based on a set of weight-transformed data samples corresponding to the set of data samples, a plurality of subsets of weight-transformed data samples associated with respective intervals of time, wherein a subset of weight-transformed data samples of the plurality of subsets of weight-transformed data samples corresponds to a balanced state associated with the respective data traffic at the plurality of data centers;

generating respective indices associated with the plurality of subsets of weight-transformed data samples, the respective indices indicating at least one of the balanced state associated with the respective data traffic at the plurality of data centers or an imbalanced state associated with the respective data traffic at the plurality of data centers; and transmitting instructions to cause display of a user interface indicating at least one index of the respective indices, the at least one index being associated with at least one subset of weight-transformed data samples of the plurality of subsets of weight-transformed data samples, and the at least one index failing to satisfy at least one threshold value.

16. The computer-implemented method of claim 15, further comprising:

receiving a request for information corresponding to the respective data traffic at the plurality of data centers; and transmitting, responsive to the request, the information, the information including one or more of application data corresponding to an application associated with the respective data traffic, the set of data samples, a status associated with respective data centers of the plurality of data centers, or an indication of computational resource usage associated with the respective data centers.

17. The computer-implemented method of claim 16, wherein the request is received based on user input at the user interface.

18. The computer-implemented method of claim 15, further comprising receiving instructions corresponding to a modification to data traffic associated with at least one data center of the plurality of data centers, the modification to the data traffic associated with the at least one data center corresponding to at least one updated index associated with the at least one subset of weight-transformed data samples that satisfies the at least one threshold value.

19. The computer-implemented method of claim 15, wherein obtaining the set of data samples comprises receiving, from the plurality of data centers, respective reports including the set of data samples.

20. The computer-implemented method of claim 15, wherein the at least one threshold value is based on an application associated with the respective data traffic.

* * * * *